US009815518B2

(12) United States Patent
Zhou et al.

(10) Patent No.: US 9,815,518 B2
(45) Date of Patent: *Nov. 14, 2017

(54) PROSTRATION-TYPE DUAL DRIVE BICYCLE

(71) Applicant: Lisha Zhou, Changsha (CN)

(72) Inventors: Lisha Zhou, Changsha (CN); Minghu Rao, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/027,596

(22) PCT Filed: Mar. 12, 2014

(86) PCT No.: PCT/CN2014/073279
§ 371 (c)(1),
(2) Date: Apr. 6, 2016

(87) PCT Pub. No.: WO2015/054985
PCT Pub. Date: Apr. 23, 2015

(65) Prior Publication Data
US 2016/0229483 A1    Aug. 11, 2016

(30) Foreign Application Priority Data

Oct. 16, 2013  (CN) .......................... 2013 1 0483935

(51) Int. Cl.
*B62M 1/12*  (2006.01)
*B62M 1/26*  (2013.01)
*B62K 3/00*  (2006.01)
*B62K 21/00*  (2006.01)
(Continued)

(52) U.S. Cl.
CPC ............... *B62M 1/12* (2013.01); *B62K 3/005* (2013.01); *B62K 21/00* (2013.01); *B62K 21/18* (2013.01); *B62M 1/26* (2013.01); *B62M 9/00* (2013.01); *B62M 2009/005* (2013.01)

(58) Field of Classification Search
CPC ........ B62M 1/36; B62K 3/005; B62K 21/125; B62K 3/00; B62J 1/28
See application file for complete search history.

(56) References Cited

U.S. PATENT DOCUMENTS 4,248,448 A * 2/1981 Dmitrowsky .......... B62K 3/005
                                                                280/261
4,867,441 A * 9/1989 Blakeman .......... A63B 22/0046
                                                                135/65
(Continued)

*Primary Examiner* — Jacob D Knutson
*Assistant Examiner* — Marlon A Arce
(74) *Attorney, Agent, or Firm* — IPro, PLLC; Na Xu

(57) ABSTRACT

A dual-drive prone bicycle comprises a frame (1), a front wheel (2), a rear wheel (3), a front drive component (4) and a rear drive component (5), wherein: the front wheel (2) and the rear wheel (3) are arranged at the front portion and rear portion of the frame (1); the rear drive component (5) comprises a rear wheel drive mechanism (51) for driving the rear wheel (3) and a treadle mechanism (52) for driving the rear wheel transmission mechanism (51); and a dynamic knee support member (53) having synchronous movement with the treadle mechanism (52) is provided between the treadle mechanism (52) and the frame (1). Designed with multi-point dynamic supports, this dual-drive prone bicycle improves riding comfort and efficiency and is combined with crawling fitness function.

17 Claims, 10 Drawing Sheets

(51) Int. Cl.
*B62K 21/18* (2006.01)
*B62M 9/00* (2006.01)

(56) References Cited

U.S. PATENT DOCUMENTS

| | | | | |
|---|---|---|---|---|
| 5,242,182 A * | 9/1993 | Bezerra | ................... | B62M 1/30 280/253 |
| 5,501,476 A * | 3/1996 | Howell | ................... | A61G 5/02 280/230 |
| 5,716,069 A * | 2/1998 | Bezerra | ................... | B62M 1/30 280/253 |
| 5,848,955 A * | 12/1998 | Gooch | ................... | A61G 5/02 482/57 |
| 6,070,894 A * | 6/2000 | Augspurger | ............. | B62M 1/14 280/249 |
| 6,837,504 B2 * | 1/2005 | Garner | ................... | B62M 1/00 280/288.4 |
| 8,118,320 B2 * | 2/2012 | Lee | ....................... | B62K 3/005 280/234 |
| 2004/0051274 A1 * | 3/2004 | Urban | .................... | B62K 3/00 280/281.1 |
| 2005/0044981 A1 * | 3/2005 | Huang | ................ | B62K 21/125 74/551.8 |
| 2007/0114086 A1 * | 5/2007 | Glessner | ............. | B62M 11/145 280/225 |
| 2011/0241305 A1 * | 10/2011 | Pi | ............................ | B62M 1/12 280/233 |

* cited by examiner

PROSTRATION-TYPE DUAL DRIVE BICYCLE

TECHNICAL FIELD

The present invention relates to a dual-drive bicycle, in particular, a dual-drive prone bicycle.

BACKGROUND

At present, bicycle is not just a means of transportation but a tool for exercise, leisure, entertainment, tourism purpose, and it tends to be developed further as fitness equipment.

Compared with the traditional single-drive bicycle only powered by human legs, a dual-drive bicycle that requires the rider to use both hands and feet has obvious advantages mainly in that it greatly improves drive efficiency and exercises the rider's upper limb. At present, this dual-drive design is mainly applied in traditional upright bicycle with saddle. For example, in a Chinese patent literature titled "Bicycle Front Wheel Drive" (Publication Patent Number: CN2818318Y), a crank sprocket is used for driving the front wheel; in a Chinese patent literature titled "Combined-Drive Bicycle" (Publication Patent Number: CN102498034A, a crank rotary bevel gear is used for drive and for power transmission to the rear wheel; in another Chinese patent literature titled "Hand and Foot Driven Bicycle" (Publication Patent Number: CN102180223A), a swing rocker is used for drive and for power transmission to the rear wheel.

Though the above dual-drive methods have improved drive efficiency, defects of upright bicycles with saddle in terms of aerodynamics, human anthropotomy, human biology, hemodynamics and ergonomics remain unsolved: 1. As the rider rides upright on the saddle, the large windward area and air resistance will lower riding efficiency and speed; 2. Upright riding position increases strain on the rider's spine; 3. To eliminate air resistance, the rider has to bend his/her upper body on the steering handle, causing high strain on both abdomen and spin; 4. This position is unfavorable for venous blood backflow of lower limbs; 5. The rider's weight and friction with the saddle make his/her hip uncomfortable and susceptible to other injuries.

To tackle the above disadvantages of traditional upright bicycles with saddle, prone bicycles have been proposed, for example, CN1126683C "Bicycle with Chain Drive, Multi-Gear and Pedal outside the Rear Wheel"; CN2564461Y "Prone Bicycle"; U.S. Pat. No. 5,887,882 "Prone Bicycle" and U.S. Pat. No. 6,050,584 "Bicycle Placing Rider in Substantially Semi-Prone Riding Position". In the above proposals, rider's body posture has been changed from upright to prone or semi-prone posture. However, rider's body support problem remains unsolved.

A direct combination of existing prone or semi-prone riding structure with dual-drive structure will cause defects like unbalance, uncoordinated movement. In addition, it is not easy for the rider to master riding skills. To further popularize the dual-drive bicycle, it is necessary to improve its drive method and riding comfort and to make its riding skills easier to master.

SUMMARY

To tackle the shortages of the prior art, the present invention provides a dual-drive prone bicycle designed with multi-point dynamic supports, improved comfort and efficiency and combined crawling fitness function.

The present invention solves the above technical problems with the following technical schemes:

A dual-drive prone bicycle comprises a frame, a front wheel, a rear wheel, a front drive component and a rear drive component, in which, the front wheel and the rear wheel are arranged at the front portion and rear portion of the frame, wherein: the rear drive component comprises a rear wheel drive mechanism for driving the rear wheel and a treadle mechanism for driving the rear wheel drive mechanism; and a dynamic knee support member having synchronous movement with the treadle mechanism is provided between the treadle mechanism and the frame.

The rear wheel drive mechanism comprises a first driven sprocket, a first drive sprocket and a first chain, wherein, the first driven sprocket is mounted on the rear wheel, the first drive sprocket is mounted in the middle of the frame, and the first chain is surrounded on the first driven sprocket and the first drive sprocket; the treadle mechanism comprises a pair of cranks, a pair of pedals and a pair of pedal connecting rods on both sides of the frame, in which, one end of each crank is permanently connected to the first drive sprocket center while the other end is pivotally connected to a pedal connecting rod, and the other end of the pedal connecting rod is connected to the pedal.

The dynamic knee support member comprises a pair of rockers and a pair of knee support pads on both sides of the frame, in which, the upper end of each rocker is pivotally connected to the rear upper portion of the frame, and the lower end is pivotally connected to the pedal spindle; the rocker, the pedal connecting rod and the crank on one side of the first drive sprocket form a group of crank rocker mechanism; and each knee support pad is mounted cantileveredly in the middle of the pedal connecting rod with a support.

The dynamic knee support member comprises a pair of rockers and a pair of knee support pads on both sides of the frame, in which, the lower end of each rocker is pivotally connected to the rear lower portion of the frame, and the upper end is pivotally connected to the pedal spindle; the rocker, the pedal connecting rod and the crank on one side of the first drive sprocket form a group of crank rocker mechanism; and each knee support pad is mounted cantileveredly in the middle of the pedal connecting rod with a support.

The dynamic knee support member comprises a pair of guide rails and a pair of knee support pads on both sides of the frame, in which, each guide rail is fixed to the frame, and one end of each pedal connecting rod is pivotally connected to the crank while the other end is arranged with a U-shape connector that is pivotally connected to the pedal spindle; the U-shape connector is slidably arranged on the guide rail; the guide rail, the pedal connecting rod and the crank on one side of the first drive sprocket form a group of crank slider mechanism; each knee support pad is mounted in the middle of the pedal connecting rod with a support; and the bearing support point of the knee support pad and the support is right above the pedal connecting rod.

The rear wheel drive mechanism comprises a first driven sprocket, a first drive sprocket and a first chain, in which, the first driven sprocket is mounted on the rear wheel, the first drive sprocket is mounted in the rear upper portion of the frame, and the first chain is surrounded on the first driven sprocket and the first drive sprocket; the treadle mechanism comprises a pair of cranks and a pair of pedals on both sides of the frame, in which, one end of each crank is permanently connected to the first drive sprocket center while the other end is pivotally connected to the pedal.

The dynamic knee support member comprises a pair of rockers, a pair of connecting rods and a pair of knee support pads on both sides of the frame, in which, the lower end of each rocker is pivotally connected to the middle lower portion of the frame, and one end of each connecting rod is pivotally connected to the upper end of the rocker while the other is arranged with a U-shape connector that is pivotally connected to the pedal spindle; the rocker, the connecting rod and the crank on one side of the first drive sprocket form a group of crank rocker mechanism; each knee support pad is mounted in the middle of the connecting rod with a support; and the bearing support point of the knee support pad and the support is right above the connecting rod.

The front drive component comprises a dual-crank revolving gear and a link gear, in which, the link gear comprises a transmission shaft and a synchronous chain drive train; the upper end of the transmission shaft is connected to the spindle of the dual-crank revolving gear through a first bevel gear pair and the lower end of the transmission shaft is connected to the drive wheel of the synchronous chain drive train through a second bevel gear pair; the driven wheel of the synchronous chain drive train is connected to the rear wheel drive mechanism.

A steering group comprising a steering fork, a steering linkage and a steering shaft sleeve is arranged between the dual-crank revolving gear and the front wheel, in which, the steering shaft sleeve comprises a spindle tube on the spindle of the dual-crank revolving gear and a transmission shaft tube on the transmission shaft; the spindle tube and the transmission shaft tube are formed as a whole through a connecting plate; the transmission shaft tube is connected to the upper end of the steering fork through the steering linkage; and the lower end of the steering fork supports on the axle of the front wheel.

A steering group comprising a steering fork and a steering shaft sleeve is arranged between the dual-crank revolving gear and the front wheel, in which, the upper end of the steering shaft sleeve is on the spindle of the dual-crank revolving gear; the lower end of the steering shaft sleeve passes through the transmission shaft and connects to the upper end of the steering fork; and the lower end of the steering fork supports on the spindle of the front wheel.

The front drive component comprises a dual-rocker reciprocating mechanism and a link gear, in which, the link gear comprises a transmission shaft and a synchronous crank rocker drive train; the upper end of the transmission shaft is connected to a pair of spindles of the dual-rocker reciprocating mechanism through a third bevel gear pair and the lower end of the transmission shaft is connected to the synchronous rocker of the synchronous crank rocker drive train through a second bevel gear pair; the crank of the synchronous crank rocker drive train is connected to the rear wheel drive mechanism through a circular gear pair.

A steering group comprising a steering fork, a steering linkage and a steering shaft sleeve is arranged between the dual-rocker reciprocating mechanism and the front wheel, in which, the steering shaft sleeve comprises a pair of spindle tubes on the spindle of the dual-rocker reciprocating mechanism and a transmission shaft tube on the transmission shaft; the spindle tubes and the transmission shaft tube are formed as a whole through a connecting plate; the transmission shaft tube is connected to the upper end of the steering fork through the steering linkage; and the lower end of the steering fork supports on the axle of the front wheel.

The front drive component comprises a single-rocker reciprocating mechanism and a link gear, in which, the link gear comprises a transmission shaft sleeve and a synchronous crank rocker drive train; the upper end of the transmission shaft sleeve is connected to the handle lever of the single-rocker reciprocating mechanism; the middle of the transmission shaft sleeve is pivotally connected to the frame; and the lower end of the transmission shaft sleeve is connected to the synchronous rocker of the synchronous crank rocker drive train; the crank of the synchronous crank rocker drive train is connected to the rear wheel drive mechanism through a circular gear pair.

A steering group comprising a steering fork, a steering linkage and a steering shaft is arranged between the single-rocker reciprocating mechanism and the front wheel, in which, the upper end of the steering shaft is connected to the portion that the handle lever of the single-rocker reciprocating mechanism extends the lower portion of the transmission shaft sleeve through a cardan joint; the lower end of the steering shaft is connected to the upper end of the steering fork through the steering linkage; and the lower end of the steering fork supports on the axle of the front wheel.

The front drive component comprises a dual-rocker reciprocating mechanism and a link gear, in which, the link gear comprises a transmission shaft sleeve and a pair of synchronous crank rocker drive trains; the upper end of the transmission shaft sleeve is connected to a pair of spindles of the dual-rocker reciprocating mechanism through a third bevel gear pair and the lower end of the transmission shaft sleeve is connected to the synchronous rocker of the synchronous crank rocker drive train through a fourth bevel gear pair; the crank of a pair of synchronous crank rocker drive trains is connected to the rear wheel drive mechanism through a circular gear pair.

A steering group comprising a steering fork and a steering shaft sleeve is arranged between the dual-rocker reciprocating mechanism and the front wheel, in which, the steering shaft sleeve comprises a pair of spindle tubes on a pair of spindles of the dual-rocker reciprocating mechanism; the upper end of the steering fork passes through the transmission shaft sleeve and forms an integral part with the spindle tube through a connecting plate; and the lower end of the steering fork supports on the axle of the front wheel.

A steering handle is mounted at the upper end of the steering fork.

The front drive component comprises a dual-crank revolving gear and a front wheel drive mechanism comprising a second driven sprocket, a second drive sprocket and a second chain, in which, the second driven sprocket is mounted at the front wheel; the second drive sprocket is mounted at the front portion of the frame and is connected to the spindle of the dual-crank revolving gear; and the second chain is surrounded between the second driven sprocket and the second drive sprocket.

A steering group comprising a steering fork and a steering shaft sleeve is arranged between the dual-crank revolving gear and the front wheel, in which, the upper end of the steering shaft sleeve is on the spindle of the dual-crank revolving gear; the lower end of the steering shaft sleeve connects to the upper end of the steering fork; and the lower end of the steering fork supports on the axle of the front wheel.

A thoraco-abdominal elastic support pad is mounted on the frame, with adjustable height, elevation angle and back-and-forth position.

A pair of crank positioning holes are mounted on the second drive sprocket at 180 degrees along the axis of rotation; in the dual-crank revolving gear, crank positioning screw holes are arranged at the crank handle approximate to the second drive sprocket; and the second drive sprocket has crank adjustment screws that pass through crank positioning holes and have fixed connection with the crank positioning screw holes.

Compared with the prior art, the invention has the advantages that:

In the dual-drive prone bicycle of the present invention, a front drive component and a rear drive component are provided. The rear drive component comprises a rear wheel drive mechanism for driving the rear wheel and a treadle mechanism for driving the rear wheel drive mechanism. A dynamic knee support member having synchronous movement with the treadle mechanism is provided between the treadle mechanism and the frame. The front drive component provides dynamic support for the rider's upper body, while the dynamic knee support member and the treadle mechanism provide main and supplementary dynamic supports for the lower body. This multi-point dynamic support scheme distributes the rider's body weight to several support points and decreases the load on each support point, making it a perfect solution for long-distance riding with good support of human body weight and improved comfortability under prone position; this design eliminates the negative effects from human body gravity and improves riding efficiency by making the human body weight do work through reasonable adjustment of gravity center of body; in addition, a fitness function is added as the prone riding supported by fore limb and knees is similar to crawling.

1—frame; 2—front wheel; 3—rear wheel; 4—front drive component; 41—dual-crank revolving gear; 42—link gear; 421—transmission shaft; 422—synchronous chain drive train; 423—first bevel gear pair; 424—second bevel gear pair; 425—synchronous crank rocker drive train; 426—third bevel gear pair; 427—circular gear pair; 428—transmission shaft sleeve; 429—fourth bevel gear pair; 43—dual-rocker reciprocating mechanism; 44—single-rocker reciprocating mechanism; 45—front wheel drive mechanism; 451—second driven sprocket; 452—second drive sprocket; 453—second chain; 454—crank adjustment screw; 5—rear drive component; 51—rear wheel drive mechanism; 511—first driven sprocket; 512—first drive sprocket; 513—first chain; 52—treadle mechanism; 521—crank; 522—pedal; 5221—strap; 523—pedal connecting rod; 53—dynamic knee support member; 531—rocker; 532—connecting rod; 5321—U shape connector; 533—knee support pad; 534—support; 535—guide rail; 6—steering group; 61—steering fork; 611—steering handle; 62—steering linkage; 63—steering shaft sleeve; 631—spindle tube; 632—transmission shaft tube; 633—connecting plate; 64—steering shaft; 7—thoraco-abdominal elastic support pad; 71—thoraco-abdominal pad plate; 72—elastic support element; 73—support tube component; 74—clamping fastener.

DETAILED DESCRIPTION

Embodiment 1

Figure 1:
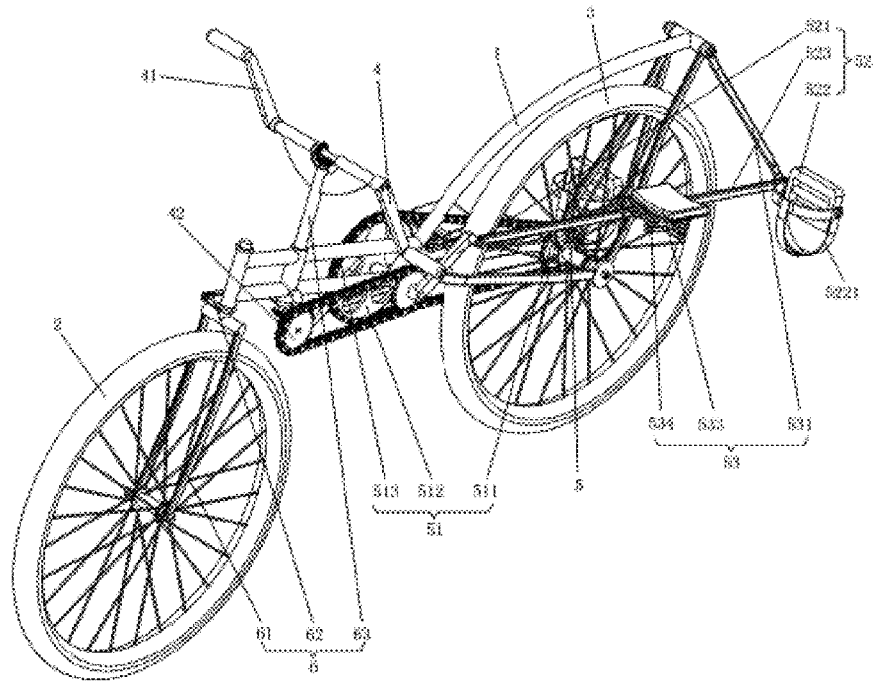
FIG. 1 is a first perspective three-dimensional structure diagram of Embodiment 1 of the present invention.
Figure 2:
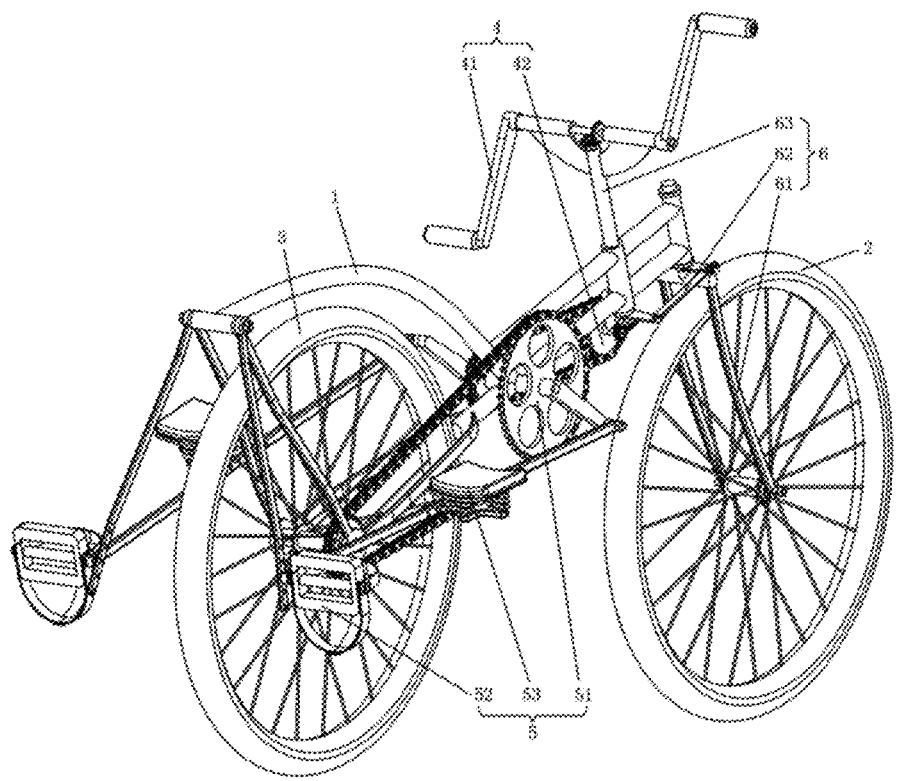
FIG. 2 is a second perspective three-dimensional structure diagram of Embodiment 1 of the present invention.
Figure 3:
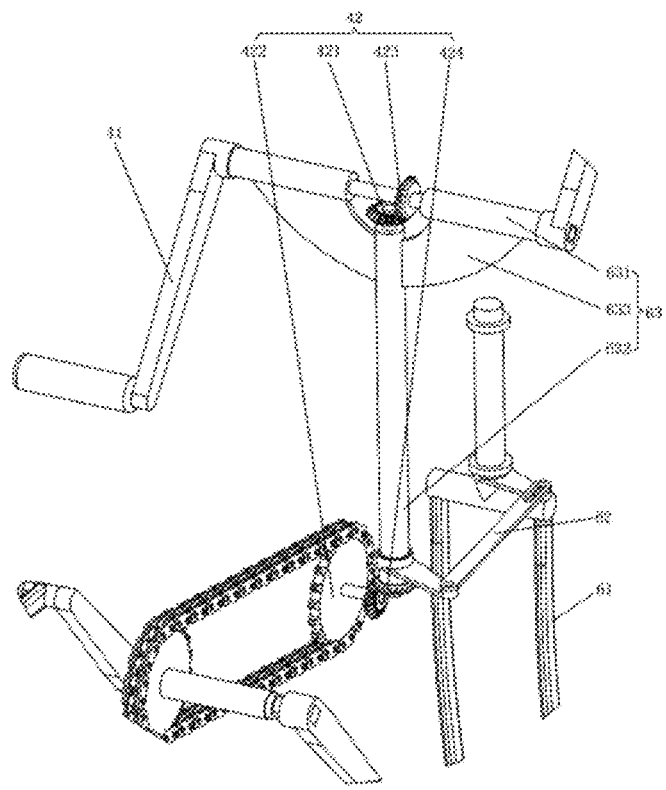
FIG. 3 is a three-dimensional structure diagram of the dual-crank revolving gear, link gear and steering group of the Embodiment 1 of the present invention.

FIGS. 1-3 show a first embodiment of the dual-drive prone bicycle of the present invention. The bicycle comprises a frame 1, a front wheel 2, a rear wheel 3, a front drive component 4 and a rear drive component 5. The front wheel 2 and the rear wheel 3 are mounted at the front portion and the rear portion of the frame 1. The rear drive component 5 comprises a rear wheel drive mechanism 51 for driving the rear wheel 3 and a treadle mechanism 52 for driving the rear wheel drive mechanism 51. A dynamic knee support member 53 having synchronous movement with the treadle mechanism 52 is provided between the treadle mechanism 52 and the frame 1. The front drive component 4 provides dynamic support for the rider's upper body, while the dynamic knee support member 53 and the treadle mechanism 52 provide main and supplementary dynamic supports for the lower body. This multi-point dynamic support scheme distributes the rider's body weight to several support points and decreases the load on each support point, making it a perfect solution for long-distance riding with good support of human body weight and improved comfortability under prone position; this design eliminates the negative effects from human body gravity and improves riding efficiency by making the human body weight do work through reasonable adjustment of gravity center of body; in addition, a fitness function is added as the prone riding supported by fore limb and knees is similar to crawling.

In this embodiment, the rear wheel drive mechanism 51 comprises a first driven sprocket 511, a first drive sprocket 512 and a first chain 513, in which, the first driven sprocket 511 is mounted on the rear wheel 3, the first drive sprocket 512 is mounted in the middle the frame 1, and the first chain 513 is surrounded on the first driven sprocket 511 and the first drive sprocket 512; the treadle mechanism 52 comprises a pair of cranks 521, a pair of pedals 522 and a pair of pedal connecting rods 523 on both sides of the frame 1, in which, one end of each crank 521 is fixed to the first drive sprocket 512 center, one end of the pedal connecting rod 523 is pivotally connected to the crank 521 and the other end is pivotally connected to the pedal 522. A strap 5221 is mounted on the pedal 522 to prevent the sole from dropping off from the pedal 522; the strap 5221 comprises an instep belt, a tiptoe belt and a connection belt, in which, the instep belt and the tiptoe belt are coupled in 90 degrees with both ends fixed to two ends of the pedal shaft respectively, and the connection belt is at the middle to connect the instep belt and the tiptoe belt, thus forming two T-shape belts.

In this embodiment, the dynamic knee support member 53 comprises a pair of rockers 531 and a pair of knee support pads 533 on both sides of the frame 1, in which, the upper end of each rocker 531 is pivotally connected to the rear upper portion of the frame 1, and the lower end is pivotally connected to the pedal 522 spindle; the rocker 531, the pedal connecting rod 523 and the crank 521 on one side of the first drive sprocket 512 form a group of crank rocker mechanism; and each knee support pad 533 is mounted cantileveredly in the middle of the pedal connecting rod 523 with a support 534.

A plurality of connecting holes are provided in the lower end of each rocker 531 to adjust height of the pedal connecting rod 523 so as to adjust height of the knee support pad 533; a plurality of connecting rods are provided in the middle of each pedal connecting rod 523 to adjust the distance between the knee support pad 533 and the pedal 522 so as to adapt to lower limb length of different riders; each knee support pad 533 is mounted cantileveredly on the pivot point connecting the rocker 531 and the pedal connecting rod 523 through a support 534; and an elastic element is provided between the knee support pad 533 and the support 534 for shock absorbing.

In this embodiment, the front drive component 4 comprises a dual-crank revolving gear 41 and a link gear 42, in which, the link gear 42 comprises a transmission shaft 421 and a synchronous chain drive train 422; the upper end of the transmission shaft 421 is connected to the spindle of the dual-crank revolving gear 41 through a first bevel gear pair 423 and the lower end of the transmission shaft 421 is connected to the drive wheel of the synchronous chain drive train 422 through a second bevel gear pair 424; the driven wheel of the synchronous chain drive train 422 is coaxially connected to the first drive sprocket 512 of the rear wheel drive mechanism 51 to transmit the power input by the dual-crank revolving gear 41 to the first drive sprocket 512, thus realizing linkage output of the front drive component 4 and the rear drive component 5. In this embodiment, the left and right cranks of the dual-crank revolving gear 41 are amounted at both ends of the spindle in 180 degrees. In other embodiments, the left and right cranks of the dual-crank revolving gear 41 can be adjusted into 0 degree based on forms of motion. In other embodiments, an overrun clutch can be mounted in the link gear 42 to release the linkage between the front drive component 4 and the rear drive component 5. Numerous mounting methods are available and all are common techniques, which will not be described in details.

In this embodiment, a steering group 6 comprising a steering fork 61, a steering linkage 62 and a steering shaft sleeve 63 is arranged between the dual-crank revolving gear 41 and the front wheel 2, in which, the steering shaft sleeve 63 comprises a spindle tube 631 on the spindle of the dual-crank revolving gear 41 and a transmission shaft tube 632 on the transmission shaft 421; the spindle tube 631 and the transmission shaft tube 632 are formed as a whole through a connecting plate 633; the transmission shaft tube 632 is connected to the upper end of the steering fork 61 through the steering linkage 62; this steering linkage 62 is a dual-rocker and four-rod mechanism, in which, one steering rocker is connected to the transmission shaft tube 632 and the other steering rocker is connected to the steering fork 61; the lower end of the steering fork 61 supports on the axle of the front wheel 2. When the rider turns the dual-crank revolving gear 41 around the transmission shaft 421, the dual-crank revolving gear 41 transmits the turning to the steering linkage 62 through the steering shaft sleeve 63, and the steering linkage 62 passes the turning to the front wheel 2 through the steering fork 61, thus controlling the steering of the front wheel 2.

In riding, the rider's lower limb knees on the knee support pads 533 that provide two main dynamic supports. In addition, the rider's feet are placed on the pedals 522 which provide two auxiliary dynamic supports. In this way, the rider can have his/her lower limb reliably supported and also take flexible and effective circling motion with the pedals 522. The rider's hip has up and down movement in the course of riding, the knees take elliptical movement, and pedals take arc reciprocating movements. When the crank 521 turns over the inflection point, the rider can move the crank 521 downwards with his/her body weight to increase drive efficiency; As to upper limb support when rider holds the dual-crank revolving gear 41 with two hands, the dual-crank revolving gear 41 provides dynamic support when it is driven for rotation; and the dual-crank revolving gear 41 provides static support when it is stopped for rotation. Under static support, the rider can conveniently and accurately control the control steering.

Embodiment 2

Figure 4:
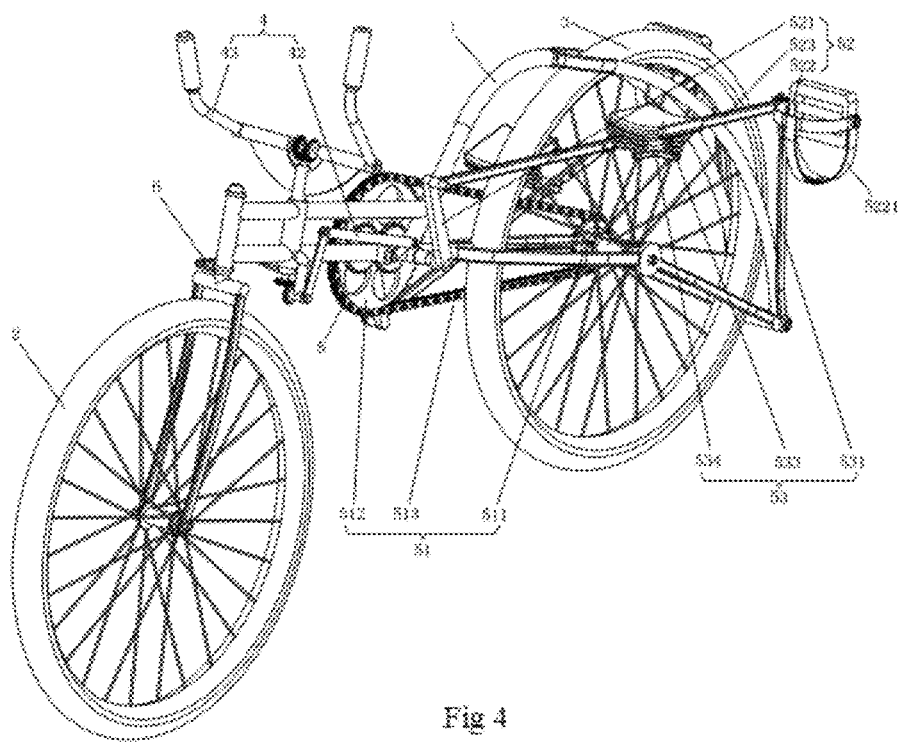
FIG. 4 is a first perspective three-dimensional structure diagram of Embodiment 2 of the present invention.
Figure 5:
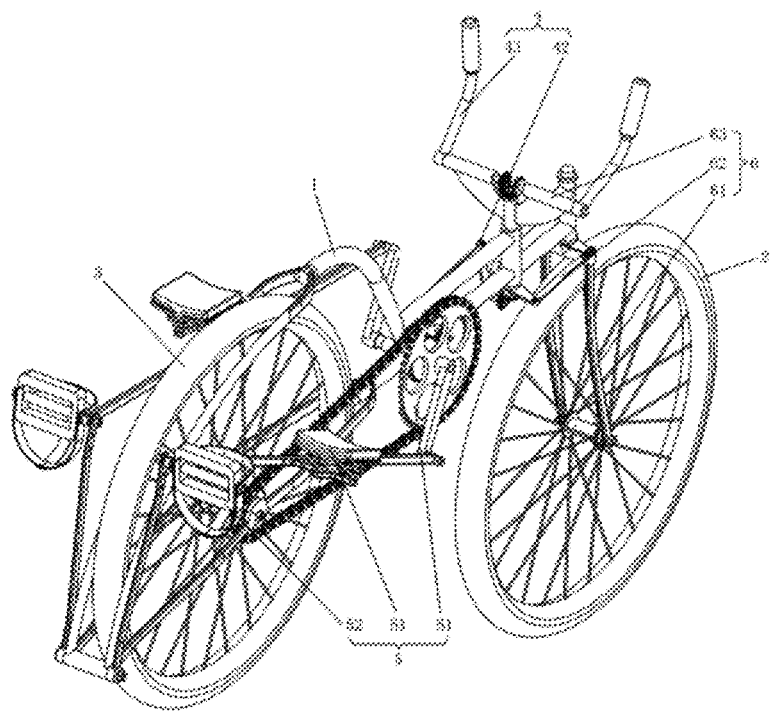
FIG. 5 is a second perspective three-dimensional structure diagram of Embodiment 2 of the present invention.
Figure 6:
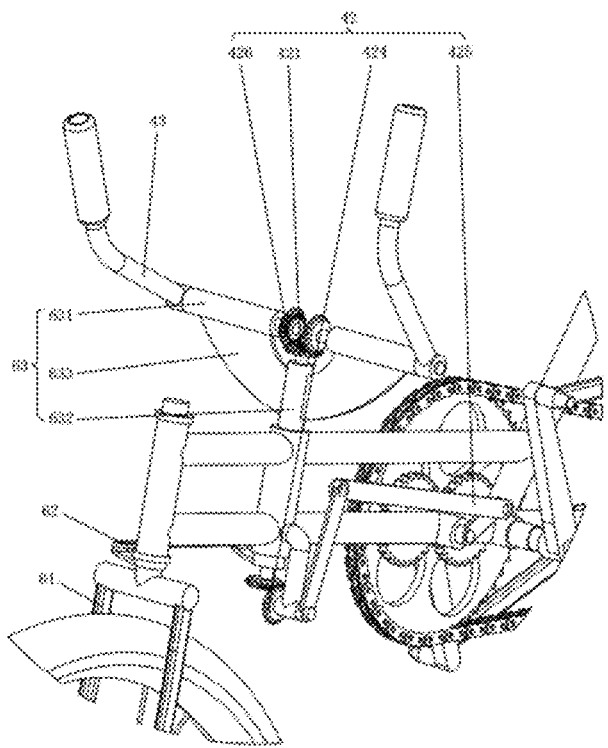
FIG. 6 is a three-dimensional structure diagram of the dual-rocker reciprocating mechanism, link gear and steering group of the Embodiment 2 of the present invention.

FIGS. 4-6 show a second embodiment of the dual-drive prone bicycle of the present invention, which differs from Embodiment 1 only in that: The dynamic knee support member 53 comprises a pair of rockers 531 and a pair of knee support pads 533 on both sides of the frame 1, in which, the lower end of each rocker 531 is pivotally connected to the rear lower portion of the frame 1, and the upper end is pivotally connected to the pedal 522 spindle; the rocker 531, the pedal connecting rod 523 and the crank 521 on one side of the first drive sprocket 512 form a group of crank rocker mechanism; and each knee support pad 533 is mounted cantileveredly in the middle of the pedal connecting rod 523 with a support 534. In installation, the hinged joint at the lower end of the rocker 531 is close to the ground as much as possible to lower the center of gravity of the entire crank rocker mechanism. In this way, the rider's center of gravity is lowered to maintain riding stability.

In this embodiment, the front drive component 4 comprises a dual-rocker reciprocating mechanism 43 and a link gear 42, in which, the link gear 42 comprises a transmission shaft 421 and a synchronous crank rocker drive train 425;

the upper end of the transmission shaft 421 is connected to a pair of spindles of the dual-rocker reciprocating mechanism 43 through a third bevel gear pair 426 and the lower end of the transmission shaft 421 is connected to the synchronous rocker of the synchronous crank rocker drive train 425 through a second bevel gear pair 424; the synchronous crank of the synchronous crank rocker drive train 425 is coaxially connected to the first drive sprocket 512 of the rear wheel drive mechanism 51 through the circular gear pair 427 to transmit the power input by the dual-rocker reciprocating mechanism 43 to the first drive sprocket 512, thus realizing linkage output of the front drive component 4 and the rear drive component 5. In other embodiments, an overrun clutch can be mounted in the link gear 42 to release the linkage between the front drive component 4 and the rear drive component 5. Numerous mounting methods are available and all are common techniques, which will not be described in details.

In this embodiment, a steering group 6 comprising a steering fork 61, a steering linkage 62 and a steering shaft sleeve 63 is arranged between the dual-rocker reciprocating mechanism 43 and the front wheel 2, in which, the steering shaft sleeve 63 comprises a pair of spindle tubes 631 on a pair of spindles of the dual-rocker reciprocating mechanism 43 and a transmission shaft tube 632 on the transmission shaft 421; the spindle tube 631 and the transmission shaft tube 632 are formed as a whole through a connecting plate 633; the transmission shaft tube 632 is connected to the upper end of the steering fork 61 through the steering linkage 62; and the lower end of the steering fork 61 supports on the axle of the front wheel 2. When the rider turns the dual-rocker reciprocating mechanism 43 around the transmission shaft 421, the dual-rocker reciprocating mechanism 43 transmits the turning to the steering linkage 62 through the steering shaft sleeve 63, and the steering linkage 62 passes the turning to the front wheel 2 through the steering fork 61, thus controlling the steering of the front wheel 2.

In riding, the support and movement method of rider's lower limb are basically same as the Embodiment 1; the rider holds the dual-rocker reciprocating mechanism 43 with his/or her hands. The dual-rocker reciprocating mechanism 43 provides dynamic support when it is driven for reciprocating movement; and the dual-rocker reciprocating mechanism 43 provides static support when it is stopped. Under static support, the rider can conveniently and accurately control the control steering.

Embodiment 3

Figure 7:
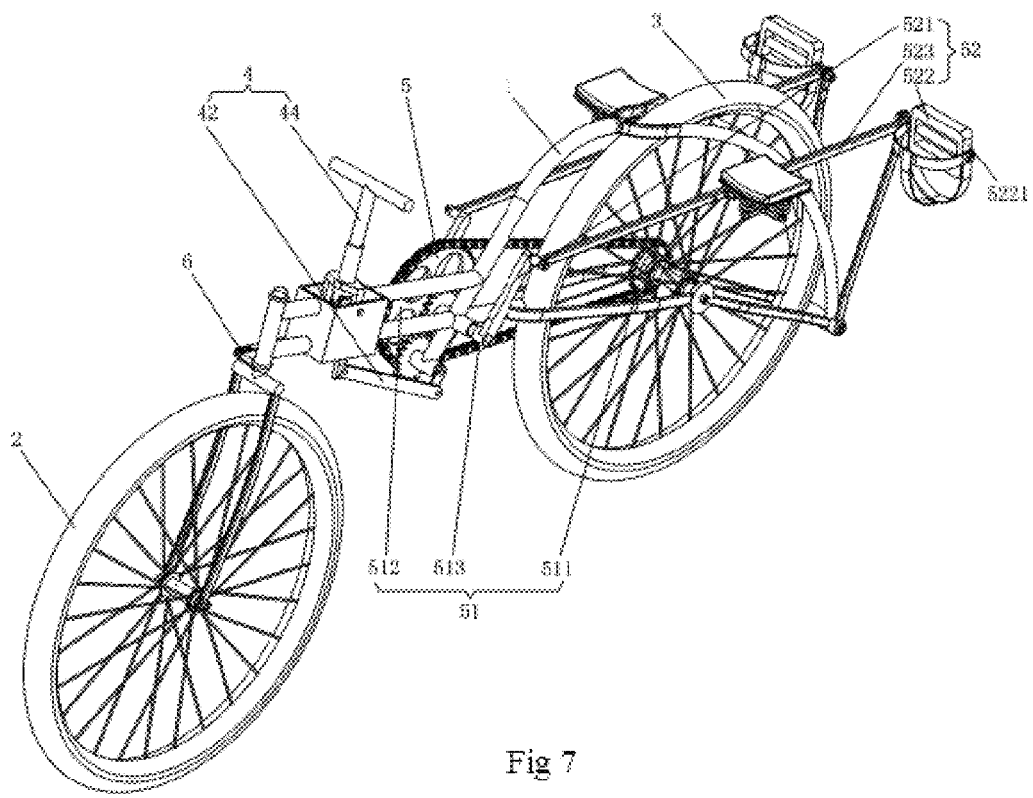
FIG. 7 is a first perspective three-dimensional structure diagram of Embodiment 3 of the present invention.
Figure 8:
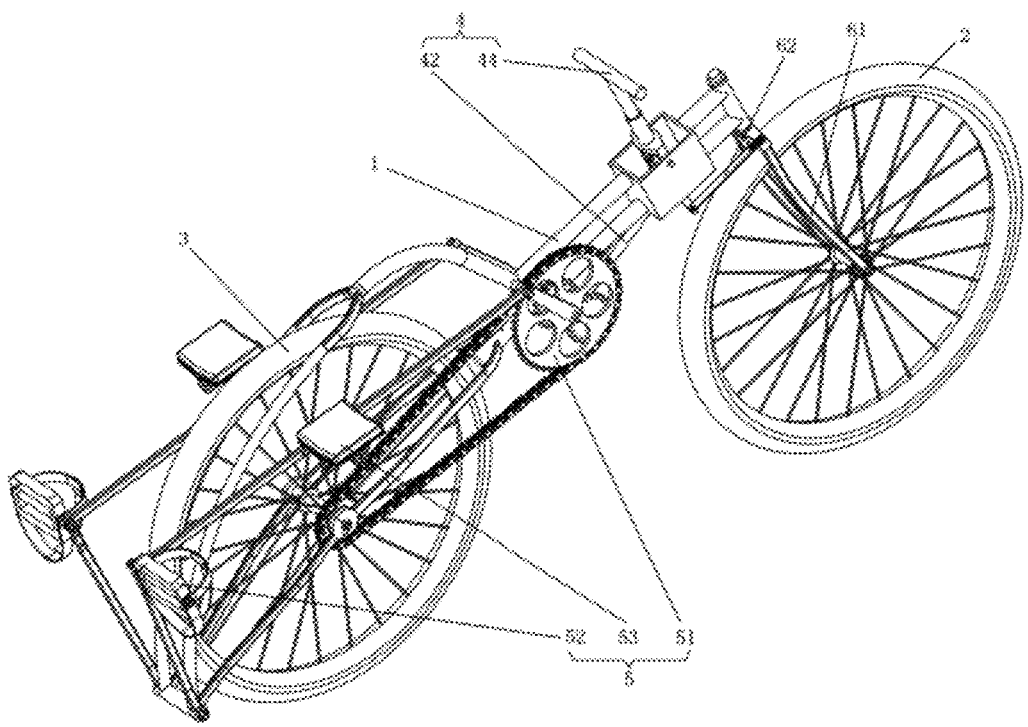
FIG. 8 is a second perspective three-dimensional structure diagram of Embodiment 3 of the present invention.
Figure 9:
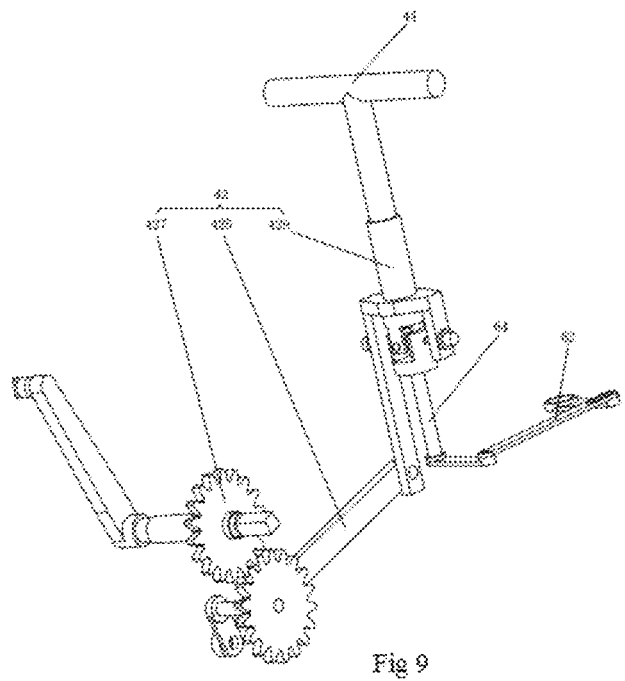
FIG. 9 is a three-dimensional structure diagram of the single-rocker reciprocating mechanism, link gear and steering group of the Embodiment 3 of the present invention.

FIGS. 7-9 show a third embodiment of the dual-drive prone bicycle of the present invention, which differs from Embodiment 2 only in that: The front drive component 4 comprises a single-rocker reciprocating mechanism 44 and a link gear 42, in which, the link gear 42 comprises a transmission shaft sleeve 428 and a synchronous crank rocker drive train 425; the upper end of the transmission shaft sleeve 428 is connected to the handle lever of the single-rocker reciprocating mechanism 44; the middle of the transmission shaft sleeve 428 is pivotally connected to the frame 1; and the lower end of the transmission shaft sleeve 428 is connected to the synchronous rocker of the synchronous crank rocker drive train 425; the synchronous crank of the synchronous crank rocker drive train 425 is coaxially connected to the first drive sprocket 512 of the rear wheel drive mechanism 51 through the circular gear pair 427 to transmit the power input by the single-rocker reciprocating mechanism 44 to the first drive sprocket 512, thus realizing linkage output of the front drive component 4 and the rear drive component 5. In other embodiments, an overrun clutch can be mounted in the link gear 42 to release the linkage between the front drive component 4 and the rear drive component 5. Numerous mounting methods are available and all are common techniques, which will not be described in details.

In this embodiment, a steering group 6 comprising a steering fork 61, a steering linkage 62 and a steering shaft 64 is arranged between the single-rocker reciprocating mechanism 44 and the front wheel 2, in which, the upper end of the steering shaft 64 is connected to the portion that the handle lever of the single-rocker reciprocating mechanism 44 extends the lower portion of the transmission shaft sleeve 428 through a cardan joint; the lower end of the steering shaft 64 is connected to the upper end of the steering fork 61 through the steering linkage 62; and the lower end of the steering fork 61 supports on the axle of the front wheel 2. When the rider turns the single-rocker reciprocating mechanism 44 around the steering shaft 64, the single-rocker reciprocating mechanism 44 transmits the turning to the steering linkage 62 through the steering shaft 64, and the steering linkage 62 passes the turning to the front wheel 2 through the steering fork 61, thus controlling the steering of the front wheel 2.

In this embodiment, two groups of the crank rocker mechanisms of the dynamic knee support member 53 are arranged symmetrically.

In riding, the support and movement method of rider's lower limb are basically same as the Embodiment 2, and the only difference is in that: the two lower limbs of the rider take synchronous movements; the rider holds the single-rocker reciprocating mechanism 44 with his/or her hands. The single-rocker reciprocating mechanism 44 provides dynamic support when it is driven for reciprocating movement; and the single-rocker reciprocating mechanism 44 provides static support when it is stopped. Under static support, the rider can conveniently and accurately control the control steering; when the upper and lower limbs of the rider move synchronously, it simulates running action with four limbs.

Embodiment 4

Figure 10:
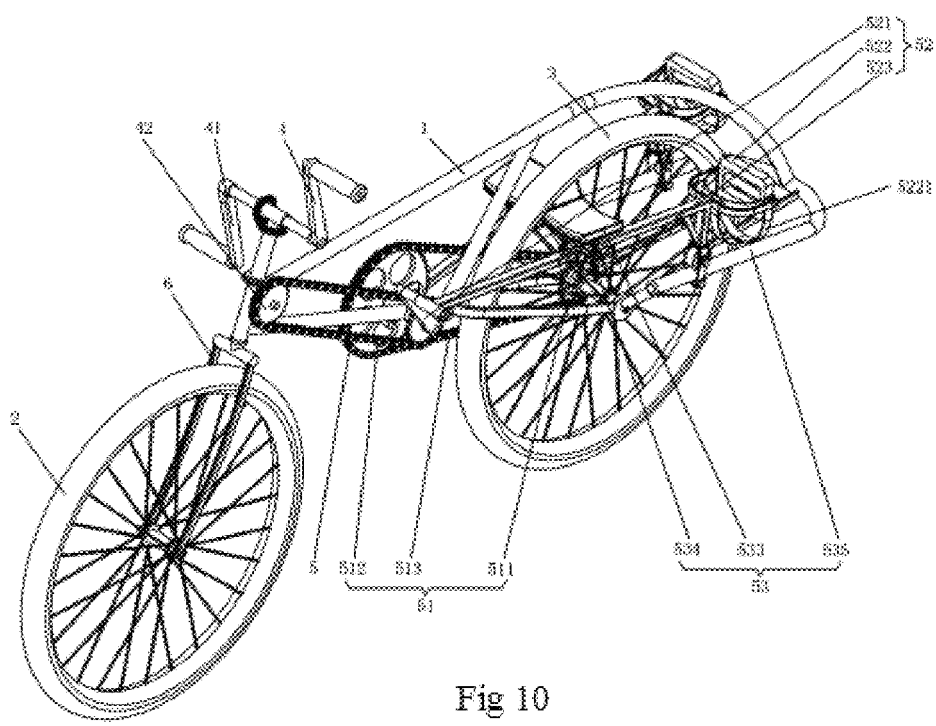
FIG. 10 is a first perspective three-dimensional structure diagram of Embodiment 4 of the present invention.
Figure 11:
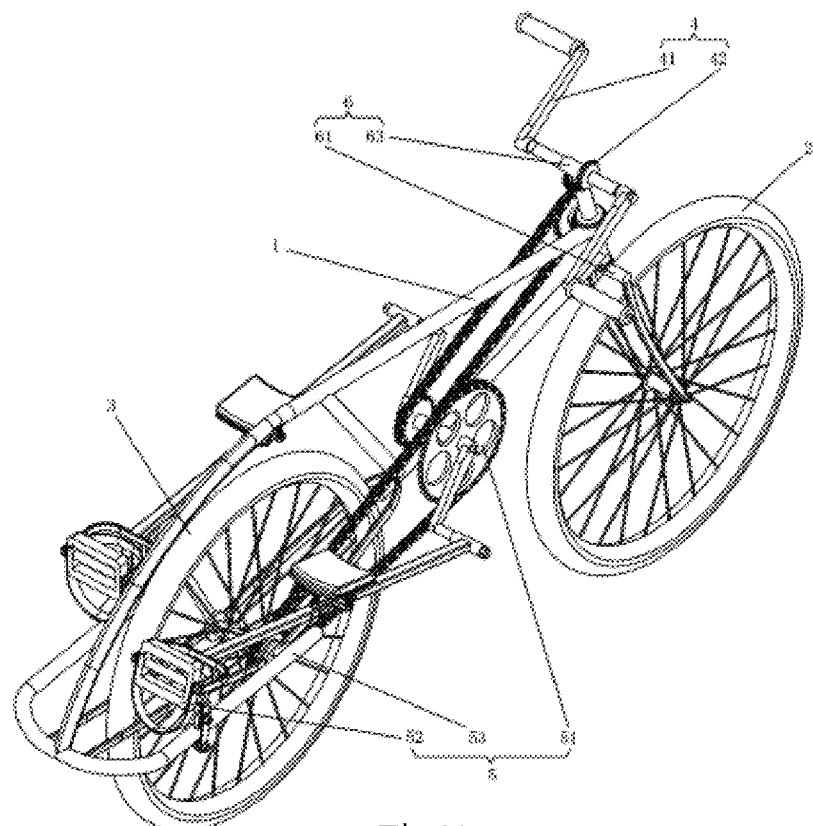
FIG. 11 is a second perspective three-dimensional structure diagram of Embodiment 4 of the present invention.
Figure 12:
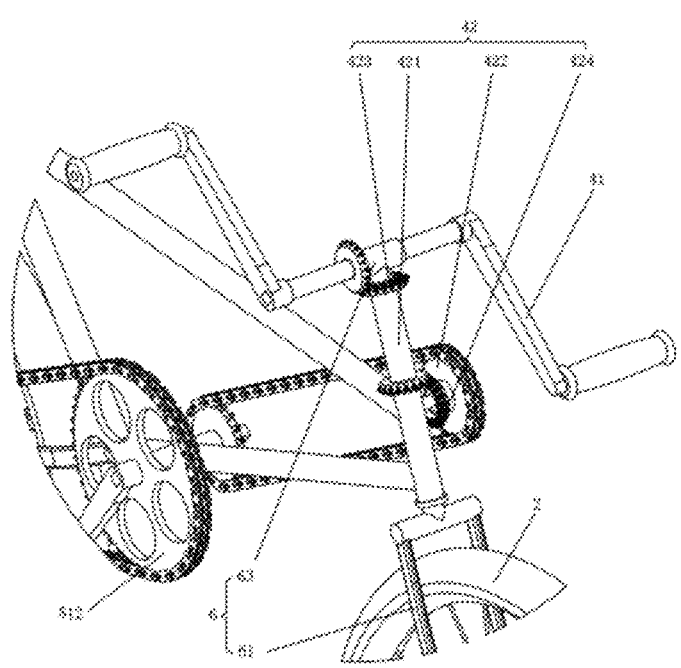
FIG. 12 is a three-dimensional structure diagram of the dual-crank revolving gear, link gear and steering group of the Embodiment 4 of the present invention.

FIGS. 10-12 show a fourth embodiment of the dual-drive prone bicycle of the present invention, which differs from Embodiment 1 only in that: the dynamic knee support member 53 comprises a pair of guide rails 535 and a pair of knee support pads 533 on both sides of the frame 1, in which, each guide rail 535 is fixed to the frame 1, and one end of each pedal connecting rod 523 is pivotally connected to the crank 521 while the other end is arranged with a U-shape connector 5321 that is pivotally connected to the pedal 522 spindle; the U-shape connector 5321 is slidably arranged on the guide rail 535; the guide rail 535, the pedal connecting rod 523 and the crank 521 on one side of the first drive sprocket 512 form a group of crank slider mechanism; each knee support pad 533 is mounted in the middle of the pedal connecting rod 523 with a support 534; and the bearing support point of the knee support pad 533 and the support 534 is right above the pedal connecting rod 523. In this embodiment, the connection part of the U-shape connector 5321 and straight pedal part of the pedal connecting rod 523 is connected with a short rod in straight down direction, and a roller is mounted at the lower end of the short rod. In addition, a stiffener is mounted between the short rod and the pedal connecting rod 523.

In this embodiment, the steering group 6 comprises a steering fork 61 and a steering shaft sleeve 63, in which, the upper end of the steering shaft sleeve 63 is mounted on the spindle of the dual-crank revolving gear 41 and the lower end of the steering shaft sleeve 63 passes through the transmission shaft 421 and connects to the upper end of the steering fork 61, and the lower end of the steering fork 61 supports on the axle of the front wheel 2. When the rider turns the dual-crank revolving gear 41 around the transmission shaft 421, the dual-crank revolving gear 41 transmits the turning to the steering fork 61 through the steering shaft sleeve 63, and the steering fork 61 passes the turning to the front wheel 2, thus controlling the steering of the front wheel 2.

In riding, the rider's lower limb knees on the knee support pads 533 that provide two main dynamic supports. In addition, the rider's feet are placed on the pedals 522 which provide two auxiliary dynamic supports. In this way, rider's hip has up and down movement in the course of riding, the knees take elliptical movement, and pedals take straight-line reciprocating movements; as to upper limb, rider holds the dual-crank revolving gear 41 with two hands. The dual-crank revolving gear 41 provides dynamic support when it is driven for rotation; and the dual-crank revolving gear 41 provides static support when it is stopped for rotation. Under static support, the rider can conveniently and accurately control the control steering. In this embodiment, smaller wheels are adopted in this embodiment to lower the rider's center of gravity.

Embodiment 5

Figure 13:
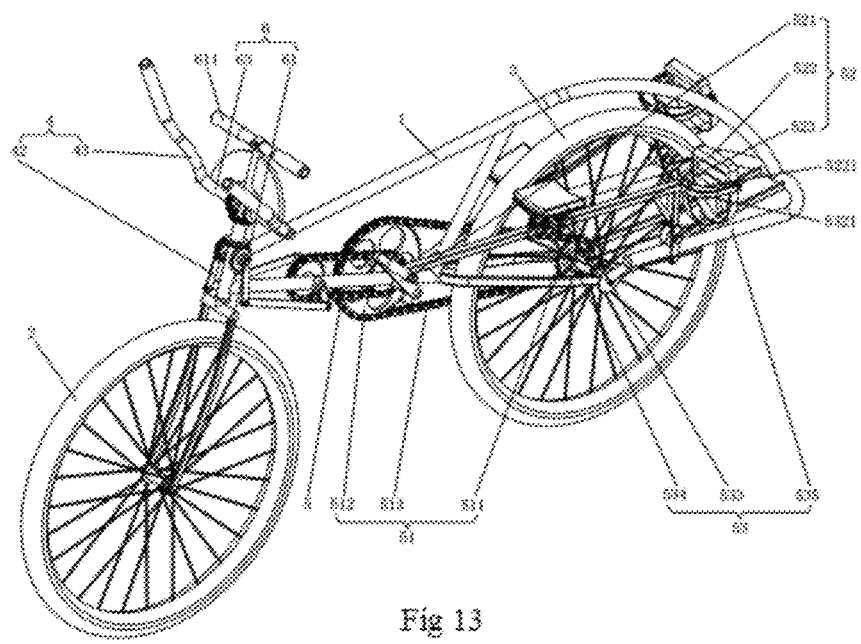
FIG. 13 is a first perspective three-dimensional structure diagram of Embodiment 5 of the present invention.
Figure 14:
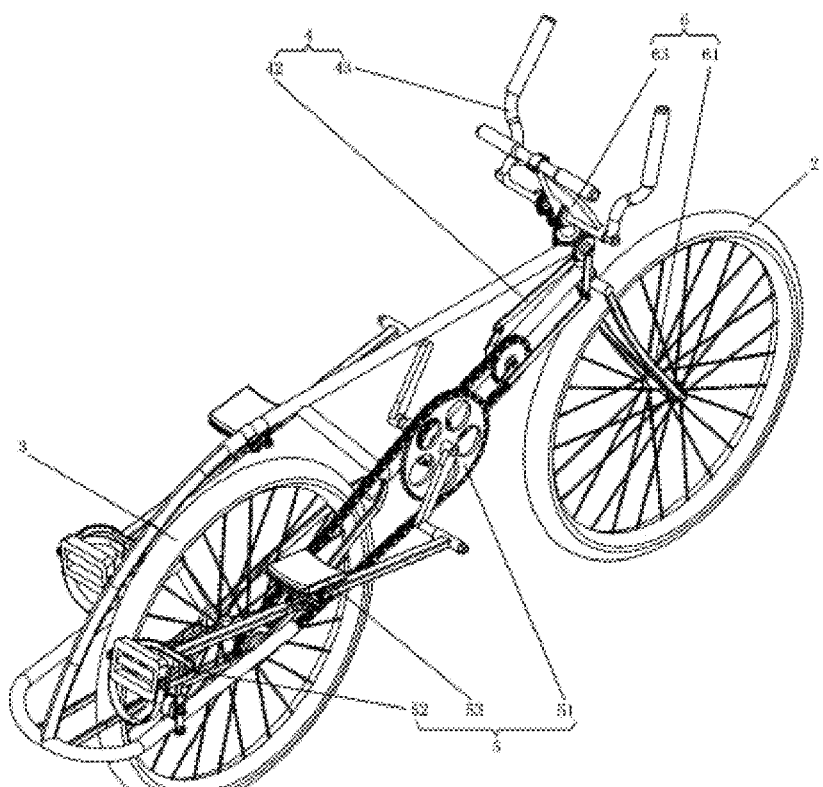
FIG. 14 is a second perspective three-dimensional structure diagram of Embodiment 5 of the present invention.
Figure 15:
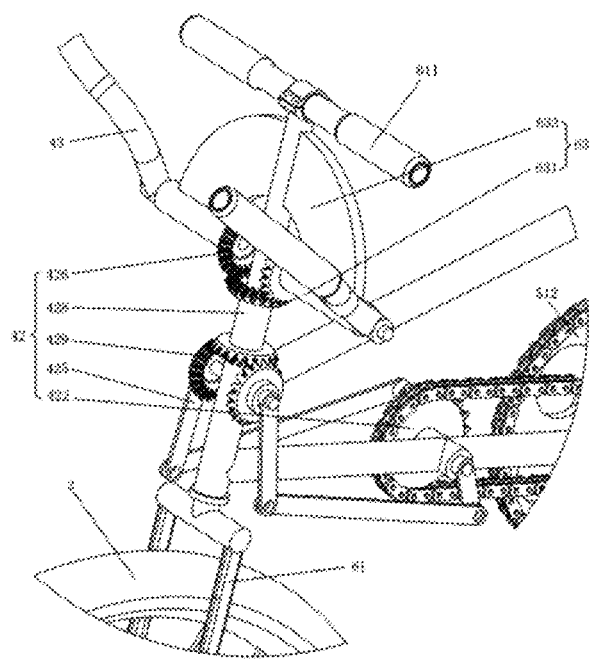
FIG. 15 is a three-dimensional structure diagram of the dual-rocker reciprocating mechanism, link gear and steering group of the Embodiment 5 of the present invention.
Figure 16:
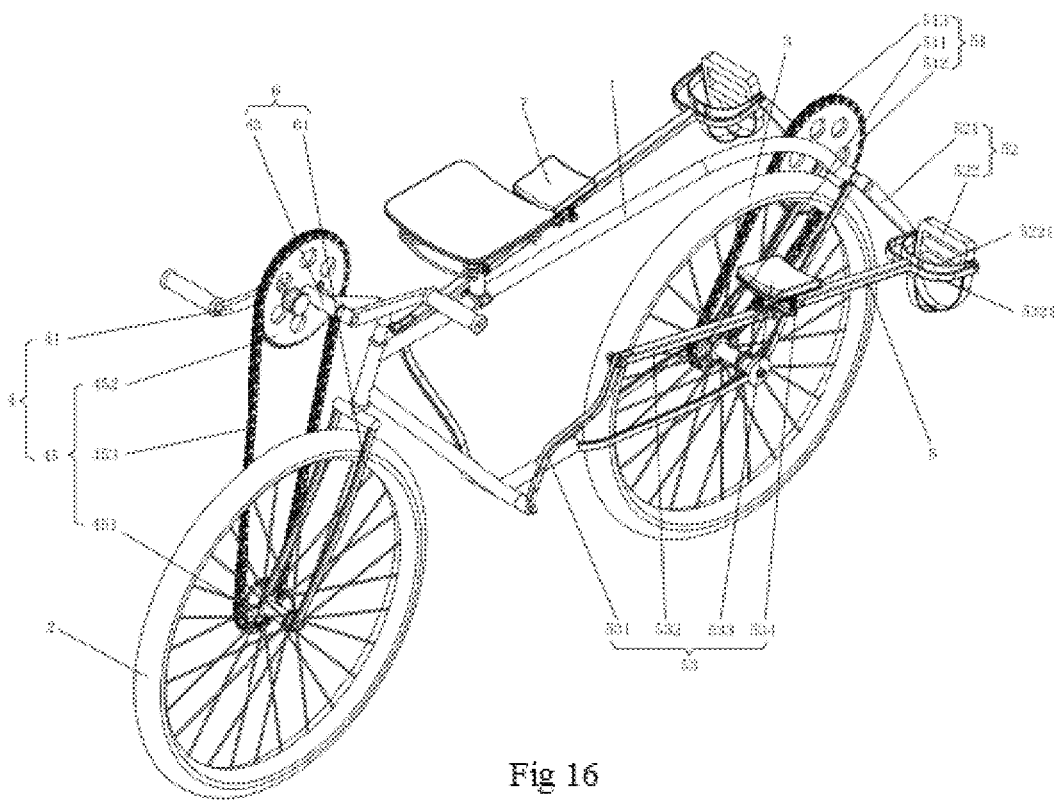
FIG. 16 is a first perspective three-dimensional structure diagram of Embodiment 6 of the present invention.
Figure 17:
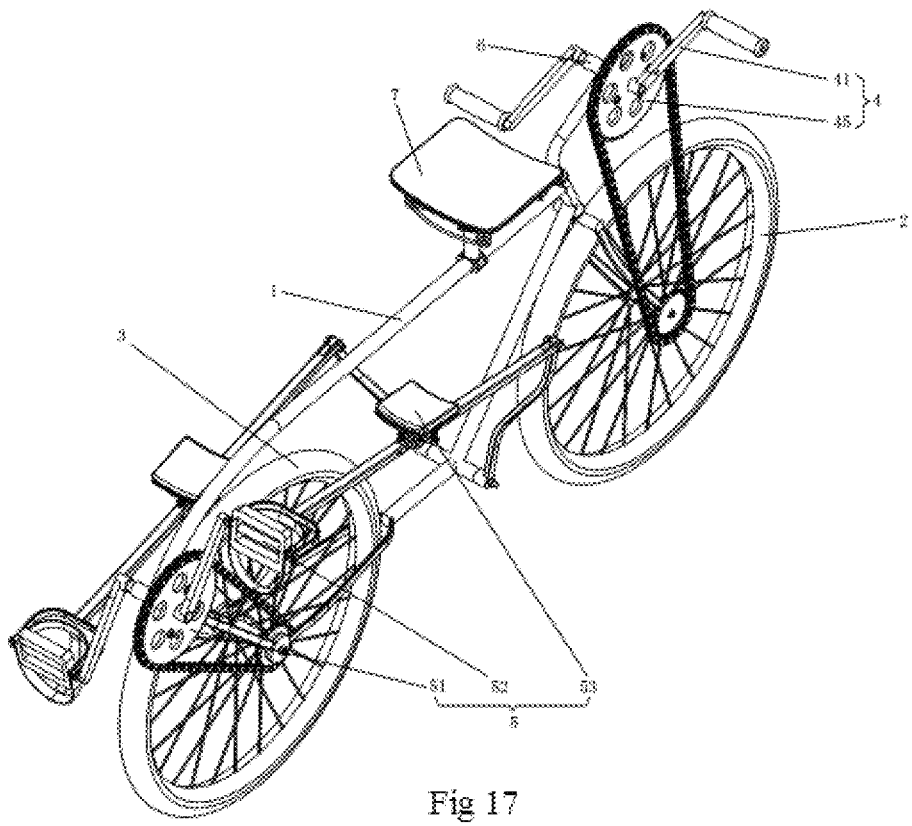
FIG. 17 is a second perspective three-dimensional structure diagram of Embodiment 6 of the present invention.

FIGS. 13-15 show a fifth embodiment of the dual-drive prone bicycle of the present invention, which differs from Embodiment 4 only in that: the front drive component 4 comprises a dual-rocker reciprocating mechanism 43 and a link gear 42, in which, the link gear 42 comprises a transmission shaft sleeve 428 and a synchronous crank rocker drive train 425; the upper end of the transmission shaft sleeve 428 is connected to a pair of spindles of the dual-rocker reciprocating mechanism 43 through a third bevel gear pair 426 and the lower end of the transmission shaft sleeve 428 is connected to the synchronous rocker of the synchronous crank rocker drive train 425 through a forth bevel gear pair 429; a pair of synchronous cranks of the synchronous crank rocker drive train 425 are coaxially connected to the first drive sprocket 512 of the rear wheel drive mechanism 51 through the synchronous chain drive train 422 to transmit the power input by the dual-rocker reciprocating mechanism 43 to the first drive sprocket 512, thus realizing linkage output of the front drive component 4 and the rear drive component 5. In other embodiments, an overrun clutch can be mounted in the link gear 42 to release the linkage between the front drive component 4 and the rear drive component 5. Numerous mounting methods are available and all are common techniques, which will not be described in details.

In this embodiment, a steering group 6 comprising a steering fork 61 and a steering shaft sleeve 63 is arranged between the dual-rocker reciprocating mechanism 43 and the front wheel 2, in which, the steering shaft sleeve 63 comprises a pair of spindle tubes 631 on a pair of spindles of the dual-rocker reciprocating mechanism 43; the upper end of the steering fork 61 passes through the transmission shaft sleeve 428 and forms an integral part with the spindle tube 631 through a connecting plate 633; and the lower end of the steering fork 61 supports on the axle of the front wheel 2. When the rider turns the dual-rocker reciprocating mechanism 43 around the transmission shaft 421, the dual-rocker reciprocating mechanism 43 transmits the turning to the steering fork 61 through the steering shaft sleeve 63, and the steering fork 61 passes the turning to the front wheel 2, thus controlling the steering of the front wheel 2.

In this embodiment, a steering handle 611 is mounted at the upper end of the steering fork 61. The rider can hold the steering handle 611 that provides static support, or accurately control the steering through the steering handle 611.

In riding, the support and movement method of rider's lower limb are basically same as the Embodiment 4; and the support and movement method of rider's upper limb are basically same as the Embodiment 2. The only difference is in that: the rider can release the dual-rocker reciprocating mechanism 43 and hold the steering handle 611 to rest up his/her upper limb, which is good for control steering.

Embodiment 6

FIGS. 16-20 show a sixth embodiment of the dual-drive prone bicycle of the present invention, which differs from Embodiment 1 only in that: the rear wheel drive mechanism 51 comprises a first driven sprocket 511, a first drive sprocket 512 and a first chain 513, in which, the first driven sprocket 511 is mounted on the rear wheel 3, the first drive sprocket 512 is mounted in the rear upper portion of the frame 1, and the first chain 513 is surrounded on the first driven sprocket 511 and the first drive sprocket 512; the treadle mechanism 52 comprises a pair of cranks 521 and a pair of pedals 522 on both sides of the frame 1, in which, one end of each crank 521 is permanently connected to the first drive sprocket 512 center and the other end is pivotally connected to the pedal 522. The dynamic knee support member 53 comprises a pair of rockers 531, a pair of connecting rods 532 and a pair of knee support pads 533 on both sides of the frame 1, in which, the lower end of each rocker 531 is pivotally connected to the middle lower portion of the frame 1, and one end of each connecting rod 532 is pivotally connected to the upper end of the rocker 531 while the other is arranged with a U-shape connector 5321 that is pivotally connected to the pedal 522 spindle; the rocker 531, the connecting rod 532 and the crank 521 on one side of the first drive sprocket 512 form a group of crank rocker mechanism; each knee support pad 533 is mounted in the middle of the connecting rod 532 with a support 534; and the bearing support point of the knee support pad 533 and the support 534 is right above the connecting rod 532. When the rider drives the rear drive component 5, the rear wheel 3 independently provides driving force.

In this embodiment, the front drive component 4 comprises a dual-crank revolving gear 41 and a front wheel drive mechanism 45 comprising a second driven sprocket 451, a second drive sprocket 452 and a second chain 453, in which, the second driven sprocket 451 is mounted at the front wheel 2; the second drive sprocket 452 is mounted at the front portion of the frame 1 and is connected to the spindle of the dual-crank revolving gear 41; and the second chain 453 is surrounded between the second driven sprocket 451 and the second drive sprocket 452. When the rider drives the dual-crank revolving gear 41, the front drive component 4 independently provides driving force for the front wheel 2. The front drive component 4 is not linked to the rear drive component 5 to provide more operation freedom for the rider.

In this embodiment, a steering group 6 comprising a steering fork 61 and a steering shaft sleeve 63 is mounted between the dual-crank revolving gear 41 and the front wheel 2, in which, the upper end of the steering shaft sleeve 63 is mounted on the spindle of the dual-crank revolving gear 41 and the lower end of the steering shaft sleeve 63 connects to the upper end of the steering fork 61, and the lower end of the steering fork 61 supports on the axle of the front wheel 2. When the rider turns the dual-crank revolving gear 41 around the upper end of the front fork 61, the dual-crank revolving gear 41 transmits the turning to the steering fork 61 through the steering shaft sleeve 63, and the steering fork 61 passes the turning to the front wheel 2, thus controlling the steering of the front wheel 2.

In this embodiment, a thoraco-abdominal elastic support pad 7 is mounted at the frame 1 with adjustable height, elevation angle and back-and-forth position, serving as the static support for the body. The thoraco-abdominal elastic support pad 7 comprises a thoraco-abdominal pad plate 71, an elastic support element 72, a support tube component 73 and three groups of clamping fasteners 74. The thoraco-abdominal pad plate 71 is a curved surface soft pad with lower end supported on the support tube component 73 through the elastic support element 72. The three groups of clamping fasteners 74 are used for fastening the above components and the frame 1. The height, elevation angle and back-and-forth position of the thoraco-abdominal elastic support pad 7 can be adjusted by releasing corresponding clamping fastener 74 so as to improve general thoraco-abdominal elastic comfort for the rider. The thoraco-abdominal elastic support pad 7 is not always used in the course of riding. The rider only uses it when requiring rest. Therefore, in this embodiment, the thoraco-abdominal elastic support pad 7 is only supplementary support rather than necessary component.

Figure 18:
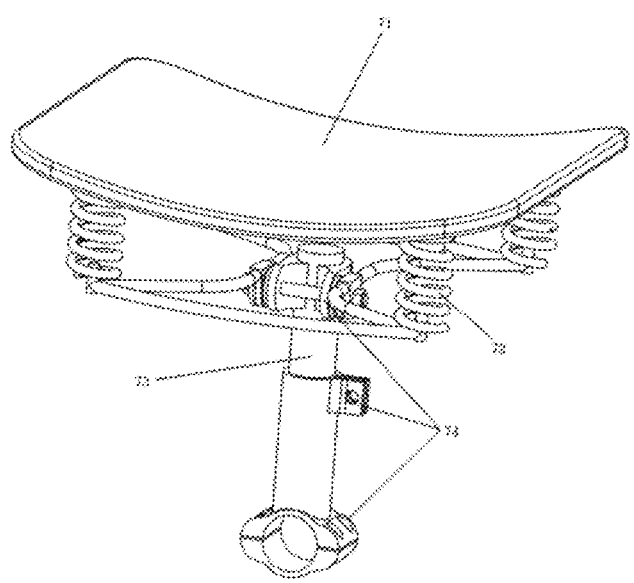
FIG. 18 is a schematic diagram of the thoraco-abdominal elastic support pad of Embodiment 6.
Figure 19:
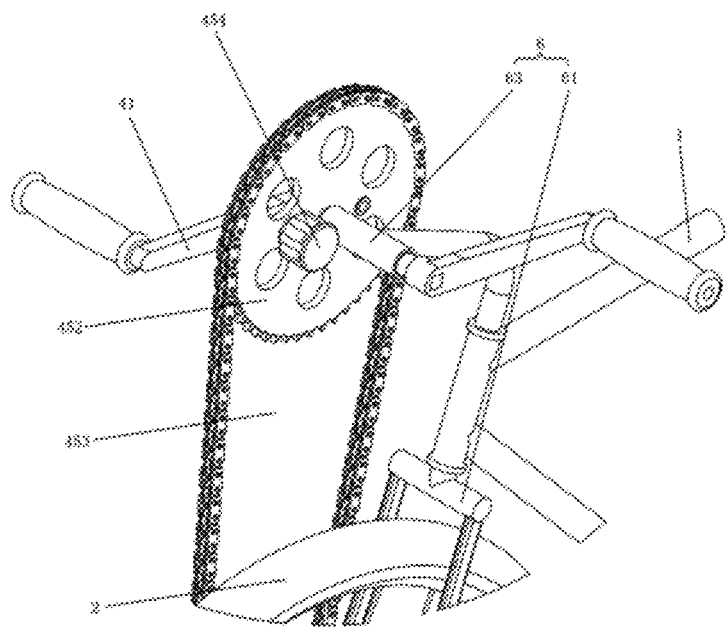
FIG. 19 is a three-dimensional structure diagram of the dual-crank revolving gear and steering group of the Embodiment 6 of the present invention.
Figure 20:
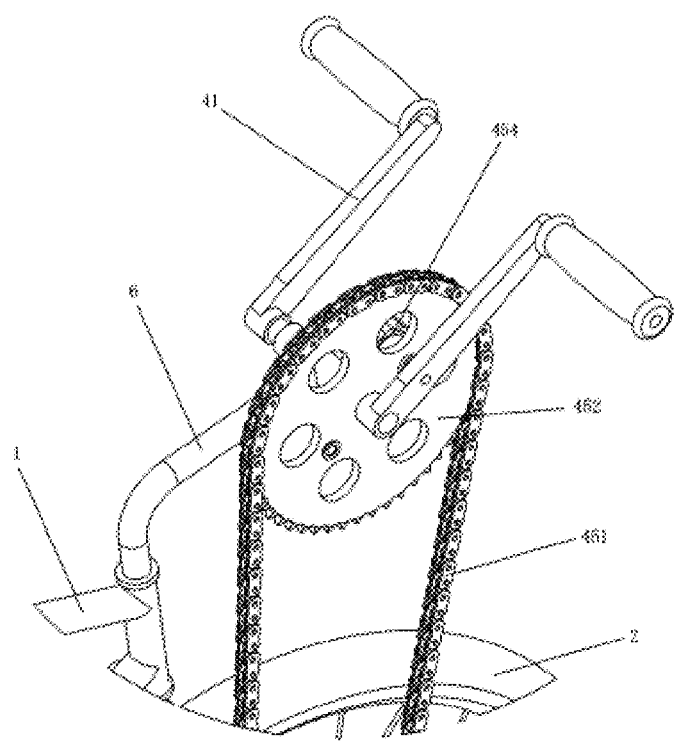
FIG. 20 is a three-dimensional structure diagram of the dual-crank revolving gear in another usage status of the Embodiment 6 of the present invention.

In this embodiment, a pair of crank positioning holes are mounted on the second drive sprocket 452 at 180 degrees along the axis of rotation; in the dual-crank revolving gear 41, crank positioning screw holes are arranged at the crank handle approximate to the second drive sprocket 452; and the second drive sprocket 452 has crank adjustment screws 454 that pass through crank positioning holes and have fixed connection with the crank positioning screw holes. In this structure, a pair of crank handles in the dual-crank revolving gear 41 can be arranged at 180 degrees (as shown in FIG. 18) or 0 degree (as shown in FIG. 19) by fixing the pair of crank handles to the second drive sprocket 452 with the crank adjustment screw 454 at different angles, which is convenient for change and operation; in this way, the rider can enjoy his/her riding with various postures.

Although the present invention has been described with reference to a number of preferred embodiments, the above description is not intended to be limiting. Those skilled in the art will appreciate that various changes and modifications or alternative embodiments of equivalent changes are possible with these techniques without departing from the scope of the present invention. Therefore, it should be understood that any simple variations, equivalent changes or modifications will fall within the scope of the disclosures without departing from the substantive features of the invention.

The invention claimed is:

1. A dual-drive prone bicycle comprising a frame, a front wheel, a rear wheel, a front drive component and a rear drive component, wherein the front wheel and rear wheel are mounted on a front portion and a rear portion of the frame; wherein the rear drive component comprises a rear wheel drive mechanism for driving the rear wheel and a treadle mechanism for driving the rear wheel drive mechanism; and a dynamic knee support member having synchronous movement with the treadle mechanism is provided between the treadle mechanism and the frame, wherein the dynamic knee support member is connected to a rear or middle portion of the frame; wherein the rear wheel drive mechanism comprises a first driven sprocket, a first drive sprocket and a first chain; wherein the first driven sprocket is mounted on the rear wheel, the first drive sprocket is mounted in the middle of the frame, and the first chain is surrounded on the first driven sprocket and the first drive sprocket; wherein the treadle mechanism comprises a pair of cranks, a pair of pedals and a pair of pedal connecting rods on both sides of the frame; wherein one end of each crank is permanently connected to the first drive sprocket center while the other end is pivotally connected to a pedal connecting rod, and the other end of the pedal connecting rod is connected to the pedal; wherein the dynamic knee support member comprises a pair of rockers and a pair of knee support pads on both sides of the frame; wherein an upper end of each rocker is pivotally connected to a rear upper portion of the frame, and a lower end is pivotally connected to the pedal spindle; wherein the rocker, the pedal connecting rod and the crank on one side of the first drive sprocket form a group of crank rocker mechanism; and each knee support pad is mounted cantileveredly in a middle of the pedal connecting rod with a support.

2. The dual-drive prone bicycle in claim 1, wherein the dynamic knee support member comprises a pair of rockers and a pair of knee support pads on both sides of the frame; wherein the lower end of each rocker is pivotally connected to a rear lower portion of the frame, and an upper end is pivotally connected to the pedal spindle; wherein the rocker, the pedal connecting rod and the crank on one side of the first drive sprocket form a group of crank rocker mechanism; and each knee support pad is mounted cantileveredly in a middle of the pedal connecting rod with a support.

3. The dual-drive prone bicycle in claim 2, wherein the dynamic knee support member comprises a pair of guide rails and a pair of knee support pads on both sides of the frame; wherein each guide rail is fixed to the frame, and one end of each pedal connecting rod is pivotally connected to the crank while the other end is arranged with a U-shape connector that is pivotally connected to a pedal spindle; the U-shape connector is slidably arranged on the guide rail; wherein the guide rail, the pedal connecting rod and the crank on one side of the first drive sprocket form a group of crank slider mechanism; wherein each knee support pad is mounted in a middle of the pedal connecting rod with a support; and a bearing support point of the knee support pad and a support is right above the pedal connecting rod.

4. The dual-drive prone bicycle in claim 1, wherein the front drive component comprises a single-rocker reciprocating mechanism and a link gear; wherein the link gear comprises a transmission shaft sleeve and a synchronous crank rocker drive train; wherein the upper end of the transmission shaft sleeve is connected to a handle lever of the single-rocker reciprocating mechanism; wherein the middle of the transmission shaft sleeve is pivotally connected to the frame; and the lower end of the transmission shaft sleeve is connected to the synchronous rocker of the synchronous crank rocker drive train; wherein a crank of the synchronous crank rocker drive train is connected to the rear wheel drive mechanism through a circular gear pair.

5. The dual-drive prone bicycle in claim 4, wherein a steering group comprising a steering fork, a steering linkage and a steering shaft is arranged between the single-rocker reciprocating mechanism and the front wheel; wherein the upper end of the steering shaft is connected to the portion that the handle lever of the single-rocker reciprocating mechanism extends the lower portion of the transmission shaft sleeve through a cardan joint; wherein the lower end of the steering shaft is connected to the upper end of the steering fork through the steering linkage; and the lower end of the steering fork supports on the spindle of the front wheel.

6. The dual-drive prone bicycle in claim 1, wherein the front drive component comprises a dual-rocker reciprocating mechanism and a link gear; wherein the link gear comprises a transmission shaft sleeve and a pair of synchronous crank rocker drive trains; wherein the upper end of the transmission shaft sleeve is connected to a pair of spindles of the dual-rocker reciprocating mechanism through a third bevel gear pair and the lower end of the transmission shaft sleeve is connected to the synchronous rocker of the synchronous crank rocker drive train through a fourth bevel gear pair; wherein the crank of a pair of synchronous crank rocker drive trains is connected to the rear wheel drive mechanism through a circular gear pair.

7. The dual-drive prone bicycle in claim 6, wherein a steering group comprising a steering fork and a steering shaft sleeve is arranged between the dual-rocker reciprocating mechanism and the front wheel; wherein the steering shaft sleeve comprises a spindle tube on the pair of spindles of the dual-rocker reciprocating mechanism; wherein the upper end of the steering fork passes through the transmission shaft sleeve and forms an integral part with the spindle tube through a connecting plate; and wherein the lower end of the steering fork supports on the spindle of the front wheel.

8. The dual-drive prone bicycle in claim 1, wherein the front drive component comprises a dual-crank revolving gear and a front wheel drive mechanism comprising a second driven sprocket, a second drive sprocket and a second chain; wherein the second driven sprocket is mounted at the front wheel; the second drive sprocket is mounted at the front portion of the frame and is connected to the spindle of the dual-crank revolving gear; and wherein the second chain is surrounded between the second driven sprocket and the second drive sprocket.

9. The dual-drive prone bicycle in claim 8, wherein a steering group comprising a steering fork and a steering shaft sleeve is mounted between the dual-crank revolving gear and the front wheel; wherein the upper end of the steering shaft sleeve is mounted on the spindle of the dual-crank revolving gear and the lower end of the steering shaft sleeve connects to the upper end of the steering fork, and the lower end of the steering fork supports on the spindle of the front wheel.

10. The dual-drive prone bicycle in claim 9, wherein a thoraco-abdominal elastic support pad is mounted on the frame with adjustable height, elevation angle and back-and-forth position.

11. The dual-drive prone bicycle in claim 8, wherein a pair of crank positioning holes are mounted on the second drive sprocket at 180 degrees along the axis of rotation; wherein in the dual-crank revolving gear, crank positioning screw holes are arranged at the crank handle approximate to the second drive sprocket; and wherein the second drive sprocket has crank adjustment screws that pass through crank positioning holes and have fixed connection with the crank positioning screw holes.

12. A dual-drive prone bicycle comprising a frame, a front wheel, a rear wheel, a front drive component and a rear drive component wherein the front wheel and rear wheel are mounted on a front portion and a rear portion of the frame; wherein the rear drive component comprises a rear wheel drive mechanism for driving the rear wheel and a treadle mechanism for driving the rear wheel drive mechanism; and a dynamic knee support member having synchronous movement with the treadle mechanism is provided between the treadle mechanism and the frame, wherein the dynamic knee support member is connected to a rear or middle portion of the frame; wherein the rear wheel drive mechanism comprises a first driven sprocket, a first drive sprocket and a first chain; wherein the first driven sprocket is mounted on the rear wheel, the first drive sprocket is mounted in a rear upper portion of the frame, and the first chain is surrounded on the first driven sprocket and the first drive sprocket wherein a pedal member comprises a pair of cranks and a pair of pedals on both sides of the frame; wherein one end of each crank is permanently connected to the first drive sprocket center while the other end is pivotally connected to the pedal; wherein the dynamic knee support member comprises a pair of rockers, a pair of connecting rods and a pair of knee support pads on both sides of the frame; wherein a lower end of each rocker is pivotally connected to a middle lower portion of the frame, and one end of each connecting rod is pivotally connected to an upper end of the rocker while the other is arranged with a U-shape connector that is pivotally connected to a pedal spindle; wherein the rocker, the connecting rod and the crank on one side of the first drive sprocket form a group of crank rocker mechanism; wherein each knee support pad is mounted in a middle of the connecting rod with a support; and a bearing support point of the knee support pad and the support is right above the connecting rod.

13. A dual-drive prone bicycle comprising a frame, a front wheel, a rear wheel, a front drive component and a rear drive component wherein the front wheel and rear wheel are mounted on a front portion and a rear portion of the frame; wherein the rear drive component comprises a rear wheel drive mechanism for driving the rear wheel and a treadle mechanism for driving the rear wheel drive mechanism; and a dynamic knee support member having synchronous movement with the treadle mechanism is provided between the treadle mechanism and the frame, wherein the dynamic knee support member is connected to a rear or middle portion of the frame; wherein the front drive component comprises a dual-crank revolving gear and a link gear; wherein the link gear comprises a transmission shaft and a synchronous chain drive train; wherein an upper end of the transmission shaft is connected to a spindle of the dual-crank revolving gear through a first bevel gear pair and an lower end of the transmission shaft is connected to a drive wheel of the synchronous chain drive train through a second bevel gear pair; and a driven wheel of the synchronous chain drive train is connected to the rear wheel drive mechanism.

14. The dual-drive prone bicycle in claim 13, wherein a steering group comprising a steering fork, a steering linkage and a steering shaft sleeve is arranged between the dual-crank revolving gear and the front wheel; wherein the steering shaft sleeve comprises a spindle tube on the spindle of the dual-crank revolving gear and a transmission shaft tube on the transmission shaft; the spindle tube and the transmission shaft tube are formed as a whole through a connecting plate; wherein the transmission shaft tube is connected to an upper end of the steering fork through the steering linkage; and a lower end of the steering fork supports on the axle of the front wheel.

15. The dual-drive prone bicycle in claim 14, wherein a steering handle is mounted at the upper end of the steering fork.

16. A dual-drive prone bicycle comprising a frame, a front wheel, a rear wheel, a front drive component and a rear drive component wherein the front wheel and rear wheel are mounted on a front portion and a rear portion of the frame; wherein the rear drive component comprises a rear wheel drive mechanism for driving the rear wheel and a treadle mechanism for driving the rear wheel drive mechanism; and a dynamic knee support member having synchronous movement with the treadle mechanism is provided between the treadle mechanism and the frame, wherein the dynamic knee support member is connected to a rear or middle portion of the frame; wherein the front drive component comprises a dual-rocker reciprocating mechanism and a link gear; wherein the link gear comprises a transmission shaft and a synchronous crank rocker drive train; wherein the upper end of the transmission shaft is connected to a pair of spindles of the dual-rocker reciprocating mechanism through a third bevel gear pair and the lower end of the transmission shaft is connected to the synchronous rocker of the synchronous crank rocker drive train through a second bevel gear pair; and wherein the crank of the synchronous crank rocker drive train is connected to the rear wheel drive mechanism through a circular gear pair.

17. The dual-drive prone bicycle in claim 16, wherein a steering group comprising a steering fork, a steering linkage and a steering shaft sleeve is arranged between the dual-crank revolving gear and the front wheel; wherein the steering shaft sleeve comprises a spindle tube on the pair of spindles of the dual-crank revolving gear and a transmission shaft tube on the transmission shaft; wherein the spindle tube and the transmission shaft tube are formed as a whole through a connecting plate; wherein the transmission shaft tube is connected to the upper end of the steering fork through the steering linkage; and wherein the lower end of the steering fork supports on the spindle of the front wheel.

* * * * *